United States Patent [19]
Goodwin et al.

[11] 3,970,838
[45] July 20, 1976

[54] DUAL CHANNEL PHASE LOCKED OPTICAL HOMODYNE RECEIVER

[75] Inventors: Frank E. Goodwin, Malibu; Ross E. Graves, Pacific Palisades, both of Calif.

[73] Assignee: Hughes Aircraft Company, Culver City, Calif.

[22] Filed: Aug. 29, 1975

[21] Appl. No.: 608,868

[52] U.S. Cl. ............................ 250/199; 325/329; 325/444
[51] Int. Cl.² .................................. H04B 9/00
[58] Field of Search ............ 250/199; 325/329, 330, 325/444

[56] References Cited
UNITED STATES PATENTS

| | | | |
|---|---|---|---|
| 3,258,597 | 6/1966 | Forrester | 250/199 |
| 3,571,597 | 3/1971 | Wood | 250/199 |
| 3,694,656 | 9/1972 | Henning | 250/199 |
| 3,939,341 | 2/1976 | Graves | 250/199 |

*Primary Examiner*—Robert L. Griffin
*Assistant Examiner*—Michael A. Masinick
*Attorney, Agent, or Firm*—Don O. Dennison; William H. MacAllister

[57] ABSTRACT

An improved homodyne receiver for use in wideband optical communications systems is disclosed. The receiver utilizes dual channelization of the optical input signal in the manner of a Costas two-phase synchronous receiver. A novel beam-splitting/phase-splitting optical assembly is used to channelize the received and the local oscillator beams and insure the desired phase relationships. The receiver is capable of phase-locked operation in the presence of noise and frequency variations in the received and local oscillator signals.

10 Claims, 5 Drawing Figures

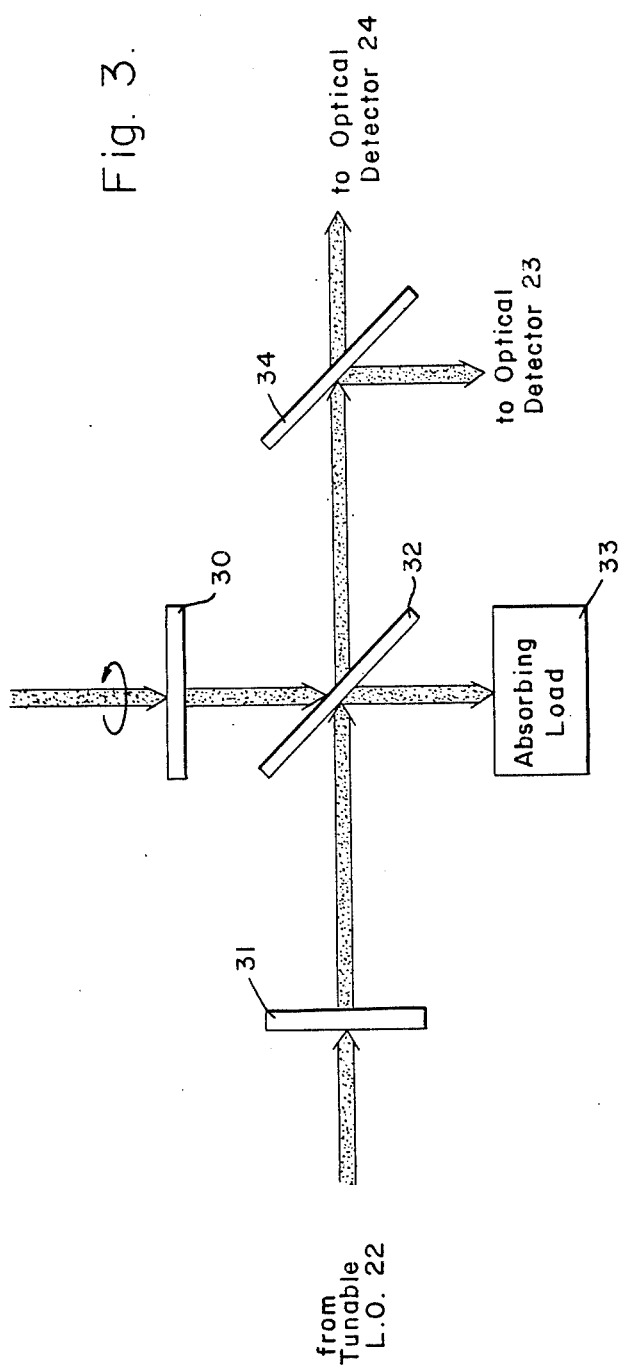
Fig. 3.
Fig. 4b.
Fig. 4a.

DUAL CHANNEL PHASE LOCKED OPTICAL HOMODYNE RECEIVER

FIELD OF THE INVENTION

This invention relates to wideband communication receivers and more specifically to homodyne receivers operable at wavelengths in the "optical" region.

DESCRIPTION OF THE PRIOR ART

In the past, many types of communications systems have been suggested which use the coherent output of a laser oscillator as the information carrier. The vast spectrum made available by laser communications is, of course, well known. At the optical wavelengths of lasers, which include not only the visible region but the infrared region as well, the generation of extremely narrow beams is highly conservative of the transmitted energy and at the same time provides a great deal of spatial security against undesired reception.

While the potential of wideband laser communications has been long recognized, the availability of components necessary to realize such systems has been limited. In recent years, however, a great number of improvements have made such systems practical. These improvements have included the development of highly reliable $CO_2$ lasers, the development of wideband optical modulators, the development of efficient wideband detectors, and the development of suitable optical components and subsystems.

Borrowing heavily from the radio frequency art, the receivers which have been proposed for use with such laser communications systems have generally operated on the so-called heterodyne principle. As is well known, in a heterodyne receiver the incoming optical signal is mixed with the coherent output of a local oscillator to produce a difference or intermediate frequency generally at rf. This rf intermediate frequency is then processed using relatively straightforward rf techniques.

While the advantages of receivers operating on the homodyne principle have been recognized at optical wavelengths for some time, a practical implementation of such a receiving system has not been available. The advantages of optical homodyne receivers include a theoretical 3 decibel improvement in noise performance over the heterodyne receiver. In contrast to the heterodyne receiver, the homodyne receiver also makes fuller, and therefore more efficient, use of the bandwidth of the optical detector. That is, for a given detector bandwidth, the homodyne receiver can accept modulation frequencies on the order of three or four times higher than those which the heterodyne receiver can accept. And, since the optical detector bandwidth is an important technical system constraint, homodyne detection offers a significant advantage in system performance over heterodyne detection.

It is, therefore, a general object of the present invention to provide a homodyne receiver operable at optical wavelengths.

It is another object of the present invention to provide an optical homodyne receiver capable of being phase-locked to the received signal over a wide range of carrier frequencies.

By way of review, homodyne detection represents a somewhat degenerate case of heterodyne detection in which the local oscillator of the receiver is at the same frequency as the received signal carrier. In other words, the homodyne receiver is much like a heterodyne receiver having an intermediate frequency (IF) centered about zero Hertz. Also, in the present context, the phase relationship between the received signal carrier and the local oscillator signal must be rather precisely maintained. Precise phase alignment on the order of a few degrees, of course, requires a phase-tracking loop in the optical receiver. Furthermore, this phase-tracking loop must have a substantial bandwidth in order to maintain lock on received signals which quite often are characterized by undesirable frequency excursions.

Communication between moving vehicles or between a fixed station and a moving vehicle, for example, requires a wide range tracking loop for Doppler shift compensation. In addition, noise in the form of unwanted excursions of the frequency of the received signal or the receiver local oscillator itself requires a tracking loop with wideband response characteristics.

In the copending application of Ross E. Graves entitled "Phase-Locked Optical Homodyne Receiver," Ser. No. 564,579, filed Apr. 2, 1975, now U.S. Pat. No. 3,939,341, there is disclosed a practical implementation of a phase-locked homodyne receiver for use at optical wavelengths. The receiver disclosed in that application utilizes a technique for generating a phase error signal which consists of "marking" the received optical input signal with an identifying modulation before it is combined with the local oscillator signal to the input of the optical detector. The phase error signal is thereafter recovered from the optical detector output at the locally-generated modulation frequency. The phase error signal is then used to control the frequency and phase of the tunable laser local oscillator to maintain the required phase alignment.

SUMMARY OF THE INVENTION

An alternative technique for achieving phase-locked operation of an optical homodyne receiver is disclosed herein. In accordance with the principles of the present invention, the above objects are accomplished by utilizing a dual-channel synchronous receiver similar to the so-called "Costas receiver" used at radio frequencies. A local oscillator beam, which is derived from a tunable laser oscillator, is coupled into a unique beam-splitting/phase-splitting optical assembly. The local oscillator beam and the signal beam, which is also coupled into the optical assembly, are first combined. The combined beams are thereafter split into two outputs which are coupled to the inputs of two optical detectors. The combination of beam-splitting/phase-splitting optical assembly establishes phase relationships between the local oscillator and signal beams in the two channels so that the outputs of the optical detectors correspond to quadrature components of the received signal. This is the same function performed in a conventional manner by the local oscillator phase-splitting or phase-shifting network normally employed for the implementation of the Costas radio frequency suppressed-carrier phase-locked receiver. In the present invention, the optical detectors serve the function of the phase detectors (synchronous AM detectors) used in the Costas receiver.

The output of the first optical detector, which is termed the quadrature component, is then passed through a video amplifier to one input of a video correlator. In a similar manner, the output of the second optical detector, which is termed the in-phase component, is passed through a second video amplifier to the second input of the video correlator. The output of the video correlator is then coupled through a frequency control circuit to control the frequency and phase of the laser local oscillator. The video output of the receiver is derived from the in-phase component.

BRIEF DESCRIPTION OF THE DRAWINGS

In order that the invention may be clearly understood and readily carried into effect, it will now be described with reference by way of example to the accompanying drawings, wherein like reference numerals correspond to like structural elements and, in which:

FIG. 3 is a block diagram of a composite beam-splitting/phase-splitting optical assembly useful in practicing the embodiment of FIG. 2; and FIGS. 4a and 4b are diagrams illustrating the relationship between the polarized beams in the optical assembly of FIG. 3.

DESCRIPTION OF THE PREFERRED EMBODIMENT

Figure 1:
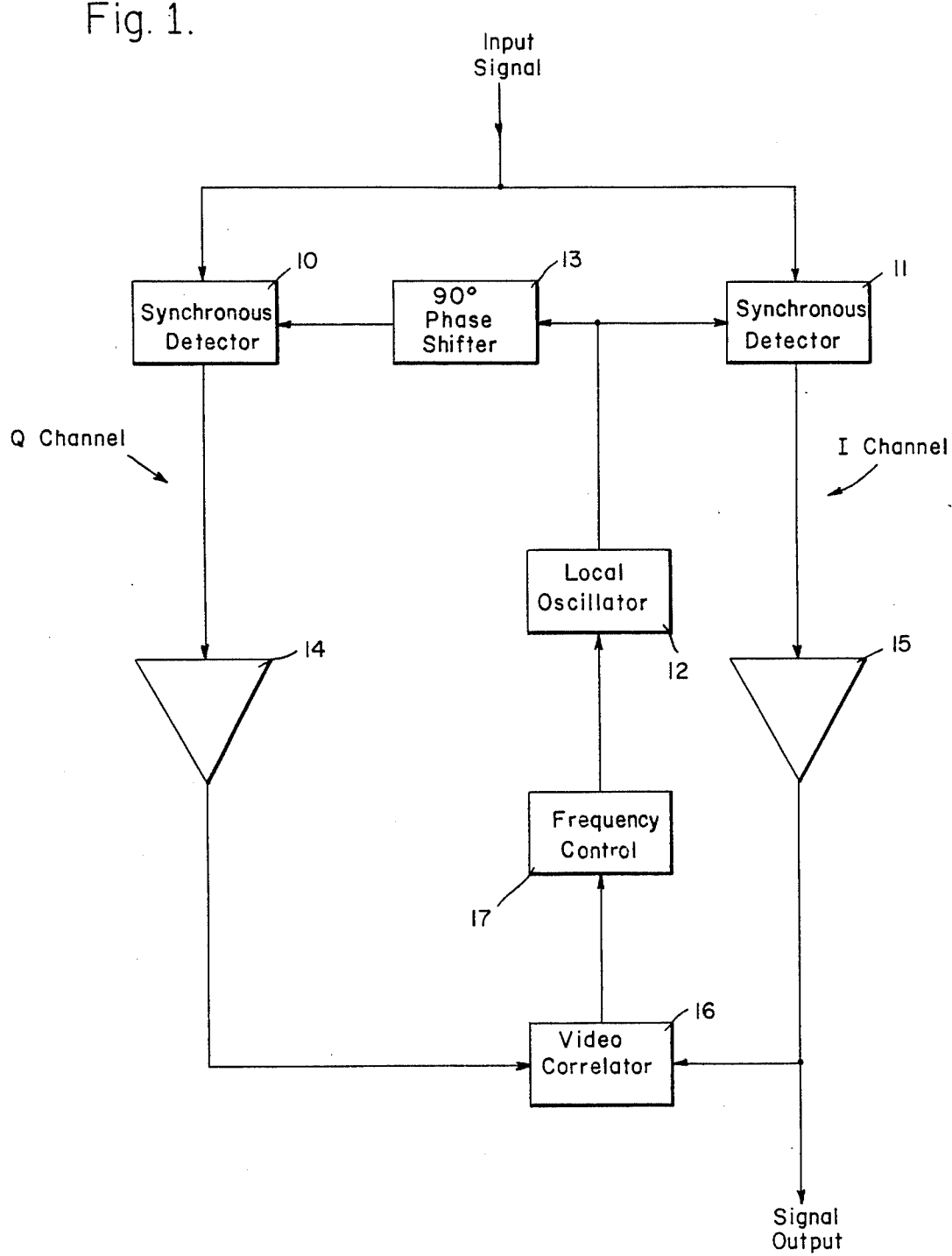
FIG. 1 is a block diagram of a simplified dual channel synchronous receiver useful in the understanding of the principles of the present invention.

In FIG. 1 there is shown a simplified block diagram of a dual-channel synchronous receiver useful in an understanding of the principles of the present invention. Such receivers have been used for many years in the radio frequency region for the synchronous reception of suppressed-carried amplitude modulated signals. This receiver, generally referred to as a Costas receiver or Costas demodulator, is described in an article entitled "Synchronous Communications," by John P. Costas, *Proceedings of the IRE*, December 1956, on pages 1713–1718.

In the circuit of FIG. 1, an input signal, typically derived from a receiving antenna, is split into two equal-amplitude components and coupled to first and second synchronous detectors 10 and 11 respectively. Although not shown in the above-cited article the usual Costas receiver employs at least one stage of radio frequency amplification in the signal path between the antenna and the synchronous detectors. In any event, the output of a controllable local oscillator 12 is coupled to a second input of synchronous detector 11. The output of local oscillator 12 is also coupled through a 90° phase shift network 13 to a second input of synchronous detector 10. The outputs of synchronous detectors 10 and 11 are coupled through respective amplifiers 14 and 15 to separate inputs of a video correlator 16.

The output of video correlator 16 is, in turn, coupled to a frequency control circuit 17 which controls the phase and frequency of local oscillator 12. The output of the synchronous receiver is obtained from the output of video amplifier 15 and is coupled to the appropriate utilization circuitry, not shown. It is understood that other circuit elements would be employed in a practical realization of such a receiver, but for the sake of clarity have been omitted in the circuit of FIG. 1.

In operation, the input signal to the dual channel receiver of FIG. 1 is split into two channels. The local oscillator output is also split into two channels one of which is phase-shifted by 90° with respect to the local oscillator signal in the other channel. The input signals in the two signal channels are synchronously detected with respect to the two phase quadrature components of the local oscillator signal. The output of synchronous detector 10 constitutes the quadrature component of the detected input signal and this channel is therefore known as the quadrature or "Q Channel." The output from synchronous detector 11, on the other hand, contains the in-phase component of the detected input signal and is therefore referred to as the "I Channel."

The Q and I Channel outputs of synchronous detectors 10 and 11 are then amplified in bandpass amplifiers 14 and 15, respectively. The error signal for the Costas phase-locked receiver of FIG. 1 is obtained by cross-correlating the two quadrature signals in video correlator 16. This error signal from video correlator 16 is filtered appropriately and fed back through frequency control circuit 17 to control the frequency and phase of local oscillator 12.

Video amplifiers 14 and 15 are included to emphasize the fact that additional gain is often required following the synchronous detectors. In addition, frequency sensitive networks may be incorporated in the amplifiers to limit the bandwidths of the detector output signals prior to their correlation at video correlator 16. As noted hereinabove, the video output from the receiver is obtained from the I Channel at the output of video amplifier 15.

The dual channel Costas receiver depicted in FIG. 1 is designed to function with suppressed carrier AM signals. It is also operational when the carrier of the received signal is not suppressed, but its primary function is for synchronous detection of suppressed carrier AM signals.

The successful operation of the Costas receiver of FIG. 1 depends upon the maintenance of the phase quadrature relationship between the local oscillator and signal components at synchronous detectors 10 and 11. At the lower radio frequencies and even at microwave frequencies, it is a relatively straightforward task to maintain the required phase relationships. This is so because the lengths of the various transmission lines coupling the input signal components and the local oscillator components to the synchronous detectors can be maintained with very tight tolerances in relation to the wavelengths of rf signals. At optical wavelengths, however, it is much more difficult to maintain the desired phase quadrature relationship. At optical frequencies, the wavelengths are measured in terms of microns rather than in terms of meters, centimeters, and millimeters. It is apparent, therefore, that in order to adapt a Costas receiver such as that depicted in FIG. 1 to the reception of signals at optical wavelengths, more is required than a one-for-one parts substitution.

Figure 2:
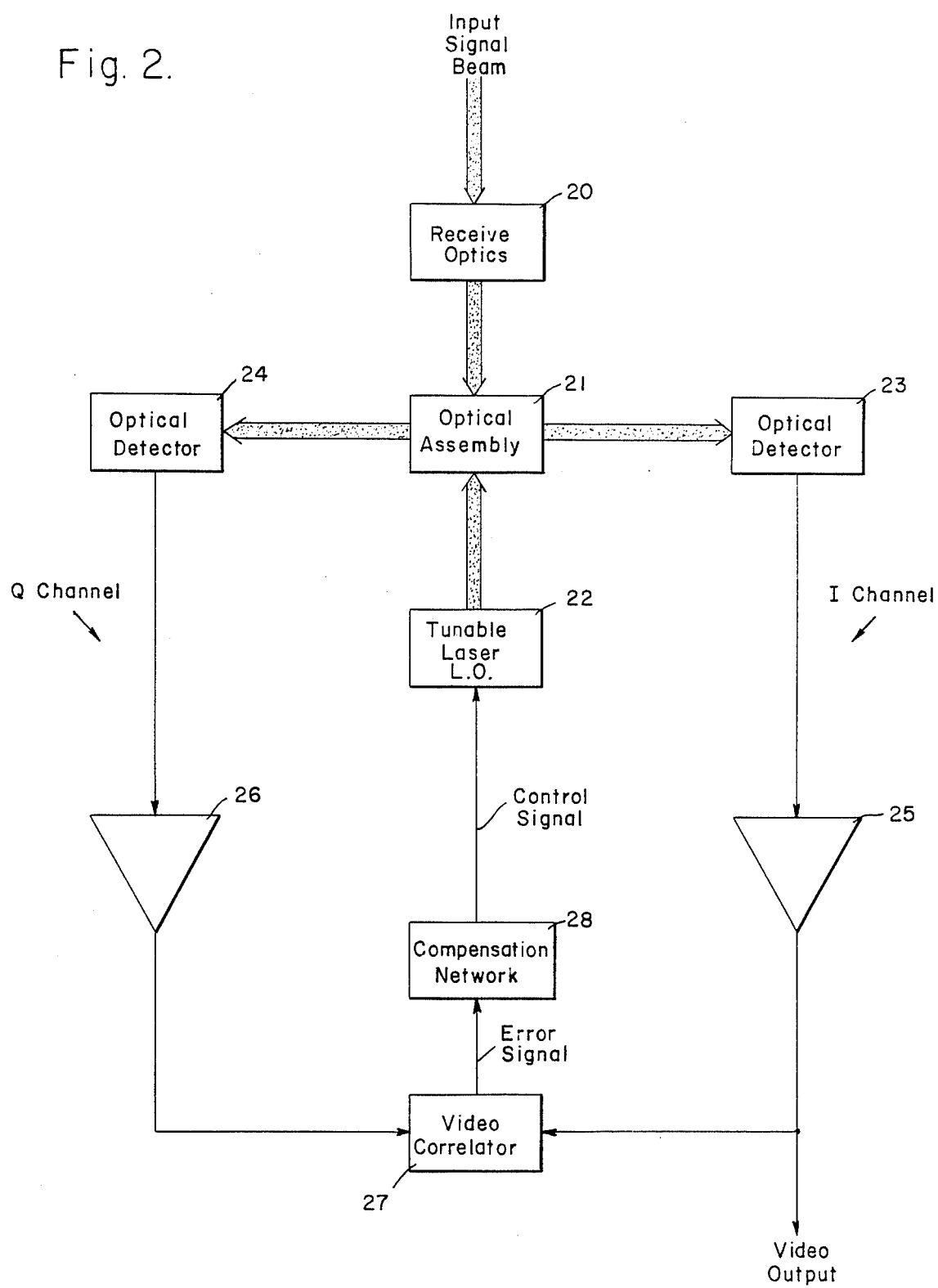
FIG. 2 is a block diagram of a preferred embodiment of the present invention.

In FIG. 2 there is shown a block diagram of a dual channel phase-locked optical homodyne receiver in keeping with a preferred embodiment of the present invention. The input signal in the form of a modulated beam of coherent light enters the receiver by means of receive optics 20. The receive optics typically include a telescope or other beam collimating means and, where appropriate, electromechanical scanning, beam directing, and filtering means. The input beam thus received is directed to one input of a composite optical assembly 21. The output beam from a tunable laser local oscillator 22 is also coupled into optical assembly 21. Composite optical assembly 21 will be described in greater detail in connection with FIG. 3 hereinbelow. At this point, however, it is sufficient to state that composite optical assembly 21 accepts the input and the local oscillator beams and couples portions of these beams each to the inputs of optical detectors 23 and 24. Composite optical assembly 21 operates in such a way that the local oscillator and signal carrier components in the two output beams (i.e., the input beams to optical detectors 23 and 24) have the correct phase relationships and magnitudes. It should also be mentioned that, unlike other Costas receivers intended for use at radio frequencies, the power distribution of the signal energy between the two channels in the present invention is preferably unequal. This factor will also be explained in greater detail hereinbelow.

In keeping with the previously adopted terminology, the output of the I Channel optical detector 23 is coupled to the input of video amplifier 25. Similarly, the output of the Q Channel optical detector 24 is coupled to the input of video amplifier 26. The outputs of video amplifiers 25 and 26 are, in turn, coupled to the two inputs of video correlator 27. The error signal output of video correlator 27 is coupled to a compensation network 28 which drives the control input of tunable laser local oscillator 22.

In modern laser communications systems, the received signal can comprise an optical carrier modulated by information-bearing modulation components extending over many tens or hundreds of megahertz. A preferred modulation format for which the present invention is well adapted is wideband amplitude modulation including, in particular, biphase modulation with a suppressed carrier. It may be assumed in connection with the embodiment of FIG. 2 that the optical wavelength of the input signal beam is in the region of 10.6 microns. This corresponds, of course, to a preferred transition of the $CO_2$ laser which, as noted above, is commonly employed in such communications systems. It is to be understood, however, that the choice of such an operating wavelength is merely exemplary and that other lasers operating on other wavelengths can be used with suitable modifications to the components of the described embodiment. In describing the operation of the embodiment of FIG. 2, it is also assumed that the input signal beam is circularly polarized. Again, circular polarization of the input beam is not necessary but merely exemplary. Linear polarization or elliptical polarization may also be employed with rather minor modifications to the described embodiment.

In operation, the input signal beam is passed through the receive optics 20 and into composite optical assembly 21. Optical assembly 21 splits the incoming beam into two components, one of which is directed to the photodetecting surface of optical detector 23 and the other component to the photodetecting surface of optical detector 24. The ratio of the input signal powers directed to the two optical detectors is preferably in the range between 10 to 1 and 100 to 1, with the majority of the power being directed to the in-phase channel optical detector 23.

The local oscillator beam generated by tunable laser local oscillator 22 is also coupled into composite optical assembly 21 where it is split into two components. One of the local oscillator components is spatially aligned with the major portion of the input signal beam and directed to optical detector 23. The other portion of the local oscillator beam is shifted in phase by 90 electrical degrees and combined with the minor portion of the input signal beam where it is spatially directed to optical detector 24. Therefore, the input signal to each optical detector is the superposition of a portion of the received signal beam and a portion of the local oscillator beam. The action of optical assembly 21 is to assure that the phase of the local oscillator beam in the input to optical detector 24 lags (leads) the phase of the signal carrier by 90° more than the corresponding phase difference between the local oscillator beam and the signal carrier beam in the input to optical detector 23. If these two beams are optically well aligned, interference will take place on the photodetecting surfaces of optical detectors 23 and 24 to produce the I Channel and Q Channel video outputs, respectively. The I Channel and Q Channel signals are then amplified by video amplifiers 25 and 26 and compared or correlated in video correlator 27.

Video correlator 27 can assume one of several alternative forms. It can, for example, comprise what is generally termed a diode bridge phase detector. Video correlator 27 might also be realized by a perfect multiplier followed by a lowpass filter. Depending upon the particular embodiment employed to realize video correlator 27, the nature of the error signal output will be characterized slightly differently. In general, however, the error signal output from video correlator 27 has the property that, in the vicinity of the region where the local oscillator signal is in-phase or in anti-phase with the carrier (possibly suppressed) of the received signal, the error signal has a magnitude which is a strictly increasing function of the magnitude of the phase error and a sign which is inverted as the error signal passes through zero. It is noted that the phase locked receiver of this embodiment (as well as Costas receivers, in general) has two stable lock points. One lock point occurs when the local oscillator signal is in-phase with the received signal carrier and the other when the local oscillator signal is 180° out of phase with the received signal carrier. In applications where this ambiguity is of concern, it may be removed by the judicious choice of the signal coding employed and by subsequent video processing.

In any event, the error signal output of video correlator 27 is processed by compensation network 28 and applied as a control signal to the control input of tunable laser local oscillator 22. Tunable laser local oscillator 22 is preferably characterized by both a wide tuning range and a wideband frequency response. One such tunable laser oscillator is described in the copending application of Ross E. Graves entitled "Tunable Laser Oscillator," Ser. No. 564,569, filed Apr. 2, 1975, and assigned to the assignee of the present invention.

As mentioned hereinabove, at optical wavelengths it is not feasible to control the lengths of separate optical paths to the required tolerances which assure that the components of the signal and the local oscillator beams at the optical detectors will have the precise phase relationships required. The composite optical assembly 21, however, first combines the local oscillator and the signal beams and then processes the combined beams to produce two output beams having the desired magnitudes and phases.

In FIG. 3, therefore, there is shown schematically the details of the composite optical assembly 21 employed in the embodiment of FIG. 2. This assembly comprises a first quarter-wave plate 30 disposed in the path of the input signal beam from receive optics 20. Quarter-wave plate 30 is adapted for rotation about an axis substantially parallel to the input signal beam as indicated by the small arrow. A second quarter-wave plate 31 is disposed in the optical path of the local oscillator beam from tunable local oscillator 22. A beam combiner 32 is provided at the intersection of the received signal and local oscillator beams. An absorbing optical load 33 is provided to serve as an absorbent termination for the excess local oscillator beam reflected from beam combiner 32 and for the minor portion of the input signal beam transmitted through beam combiner 32. Ideally, of course, it is desirable that all of the input signal beam incident upon beam combiner 32 be reflected and none transmitted to optical load 33. However, some input signal power must be lost in this way in order to couple a portion of the local oscillator output into a common path with the received signal. Disposed in the optical path at the output side of beam combiner 32 is a polarization beam splitter 34.

In operation, the received beam from receive optics 20 enters the composite optical assembly and passes through rotatable quarter-wave plate 30. As mentioned hereinabove, the input signal beam is preferably circularly polarized. While this is not necessary, the use of circular polarization in modern optical communications systems offers several advantages and is commonly used. However, if linear or elliptical polarization is employed, rather minor modifications can be made to accommodate the noncircular polarization vector. The action of quarter-wave plate 30 is to convert the circularly polarized input beam into a linearly polarized beam. The rotation of the quarter-wave plate 30 about the beam axis rotates the so-called "fast" and "slow" optical axes of the plate and hence provides rotation of the plane of polarization of the linearly polarized signal beam emerging therefrom.

The beam from tunable laser local oscillator 22, which in the present embodiment is linearly polarized, is directed through the second quarter-wave plate 31 where it is converted to a circularly polarized beam. The received signal beam and the local oscillator beam are then combined in beam combiner 32. Beam combiner 32 can comprise, for example, a partially reflecting germanium mirror. The action of the beam combiner 32 is to reflect the greater portion of the received signal beam toward polarization beam splitter 34 and to reflect the greater portion of the local oscillator beam into the absorbing optical load 33. Of course, a small portion of the received signal beam will be transmitted through the beam combiner 32 and absorbed in load 33. Similarly, a small portion of the local oscillator beam will be transmitted through beam combiner 32 toward polarization beam splitter 34.

The reason for the unequal division of power of the received signal beam and the local oscillator beam is to assure that substantially all of the received signal power is reflected toward polarization beam splitter 34 and then to the optical detectors 23 and 24. Because of the nature of beam combiner 32, the penalty for reflecting most of the received signal power is that most of the local oscillator beam power is reflected into absorbing load 33 where it is dissipated. However, since adequate local oscillator power is available, this power loss is of minimal concern. In practice, on the order of 95% of the signal power and 5% of the local oscillator power would be combined and directed toward polarization beam splitter 34.

At the output of beam combiner 32, there is a superposition of the linearly polarized received signal and the circularly polarized local oscillator signal. The loci of the electric field vectors of these two signal components are depicted graphically in FIGS. 4a and 4b respectively. The axially aligned superimposed beams thereafter impinge on polarization beam splitter 34. Polarization beam splitter 34 can comprise, for example, a wire grid polarizer well known in the optical art. The devices presently available in the 10.6 micron region of present interest permit polarization action with less the 10% reflection loss and less than 5% transmission loss. Polarization beam splitter 34 is oriented so that those components whose electric field vectors are oriented in the X-direction are reflected to optical detector 23. The components polarized in the Y-direction (that is, those components whose electric field vectors are oriented in the Y-direction) are passed through polarization beam splitter 34 to optical detector 24. Thus, the component of the linearly polarized received signal in FIG. 4a which lies along the X-axis is reflected to optical detector 23 while the component of the received signal which lies along the Y-axis is transmitted to optical detector 24; alternatively, the positions of detectors 23 and 24 could be interchanged if quarter-wave plate 30 were rotated to provide the desired power split.

The circularly polarized local oscillator beam, as is well known, may be viewed as comprising a pair of orthogonal linearly polarized components along the X- and Y-axes of the polarization beam splitter. When so viewed and when the sense of circular polarization is as indicated in FIG. 4b, the Y-component of the field vector leads the X-component of the field vector by 90°. That is, the X and Y-components of the field vector are not only orthogonal in space but the X-component considered as a function of time (that is considered with regard to phase) lags the Y-component by one-quarter cycle or 90°. As a consequence, the phase relationships between the local oscillator and signal carrier components in the two beams emerging from polarization beam splitter 34 are identical except for an additional 90° phase lead of the local oscillator signal in the beam transmitted to the quadrature optical detector 24 relative to the received signal carrier reflected to the in-phase optical detector 23. This is precisely the phase relationship that the composite optical assembly is required to establish for the implementation of the dual channel phase-locked optical homodyne receiver of FIG. 2.

By rotating quarter-wave plate 30 about the axis of the input signal beam, the orientation of the plane of polarization of the received signal relative to the optical axis of the polarization beam splitter 34 can be varied. That is, the orientation of the electric field vector depicted in FIG. 4(a) can be varied. By varying this angle, the X- and Y-components of the signal can be apportioned in the desired amounts at the two optical detectors without affecting the desired phase relationships. In order to make fullest use of the power in the received signal beam, it is desirable to divert as much as possible to optical detector 23 in the I Channel. To do so, however, results in a proportionately smaller amount of received signal power being available to optical detector 24 in the Q Channel. Fortunately, the bandwidth of the phase control loop of the receiver of FIG. 2 is sufficiently narrow that only a small portion of the received signal power is needed in the Q Channel for operation of the receiver. Typically, therefore, the composite optical assembly of FIG. 3 can be adjusted to provide a power split on the order of 10 to 1 with the majority of the received signal power directed to optical detector 23.

Because all of the signal modulation components are transmitted through the I Channel, it is necessary that optical detector 23 and video amplifier 25 have response characteristics which are wideband. For satisfactory operation it is necessary, however, to provide a low frequency cutoff in the I Channel (e.g., in video amplifier 25) to suppress the DC and other undesirable low-frequency components. These components include the so-called "1/f noise" and the local oscillator-cross-local oscillator products. At the same time, the low-frequency cutoff should be sufficiently low to pass the significant frequency components of the signal modulation. In a 300 megabit per second biphase-modulation system, for example, a lower cutoff frequency of 1 megahertz and an upper bandpass of on the order of 200 megahertz in the I Channel should prove satisfactory.

The quadrature optical detector 24 and video amplifier 26 can have a much narrower bandwidth. Since narrow band optical detectors and video amplifiers are generally less expensive, this factor is advantageous. It is recognized that some compensation may be necessary if different I Channel and Q Channel bandwidths are employed to compensate for different time delays. Such compensation techniques, however, are well known in the art. It is further recognized, however, that such a modification suppresses a portion of the signal in the quadrature channel, and hence reduces the signal-to-noise ratio in this channel. For this reason, the preferred implementation, if cost is not a compelling factor, is to use matched detectors and video amplifiers in the I and Q Channels.

For the sake of simplicity, the automatic gain control circuitry has been omitted from the embodiment of FIG. 2. It is apparent that AGC is necessary for optimum receiver performance. Again, AGC circuits are well known in the art and need not be described herein. It is noted that a single AGC voltage derived from the signal in the I Channel should be employed to control the gain of both video amplifiers 25 and 26.

In all cases, it is understood that the abovedescribed embodiment is illustrative of but one of the many possible specific embodiments which can represent applications of the principles of the present invention. Numerous and varied other arrangements can be readily devised in accordance with these principles by those skilled in the art without departing from the spirit and scope of the invention.

What is claimed is:

1. A phase-locked optical homodyne receiver comprising, in combination:
   optical input means for receiving an input signal, said input signal being characterized by a carrier frequency and information-containing modulation components;
   a controllable laser oscillator for generating a local oscillator signal having substantially the same frequency as said carrier frequency;
   an optical assembly coupled to said optical input means and to said controllable laser oscillator, said optical assembly being capable of combining a first portion of said input signal with a first portion of said local oscillator signal and a second portion of said input signal with a second portion of said local oscillator signal, the phase difference between the first portion of said local oscillator signal and the carrier of the first portion of said input signal differing by substantially 90° from the phase difference between the second portion of said local oscillator signal and the carrier of the second portion of said input signal;
   a first optical detector coupled to said optical assembly for detecting the first portion of said input signal with respect to the first portion of said local oscillator signal to produce a first video signal;
   a second optical detector coupled to said optical assembly for detecting the second portion of said input signal with respect to the second portion of said local oscillator signal to produce a second video signal;
   means for comparing said first and second video signals to produce an error signal representative of the phase difference between the local oscillator signal frequency and said carrier frequency;
   means for controlling the phase of said controllable laser oscillator signal in response to said error signal to minimize said phase difference; and
   means for deriving a video output signal from said first video signal.

2. The receiver according to claim 1 wherein the carrier energy of said input signal is suppressed with respect to that of said modulation components.

3. The receiver according to claim 1 wherein said first portion of said input signal is of substantially greater magnitude than said second portion of said input signal.

4. The receiver according to claim 1 wherein said optical assembly comprises, in combination:
   a first optical quarter-wave plate;
   a second optical quarter-wave plate;
   an optical beam combiner coupled to said first and second quarter-wave plates; and
   a polarization beam splitter coupled to said beam combiner.

5. The receiver according to claim 4 wherein said first optical quarter-wave plate is adapted for rotation about an axis substantially parallel to its optical axis.

6. An optical homodyne receiver comprising, in combination:
   first and second optical detectors each having an optical input and a video output;
   an optical input signal;
   a controllable laser oscillator for generating a local oscillator signal;
   an optical assembly coupling said local oscillator signal and said input signal to said first and second optical detectors in adjustable proportions, the portions of said local oscillator signals coupled to said first and second optical detectors differing by substantially 90° with respect to the carrier of said input signal at the optical inputs of said first and second optical detectors;
   a video correlator having at least two inputs and an output;
   means for coupling the outputs of said optical detectors to the inputs of said video correlator;
   means for coupling the output of said video correlator to a control input of said controllable laser oscillator; and
   means for deriving a video output signal from one input of said video correlator.

7. The receiver according to claim 6 wherein said video correlator comprises a diode bridge phase detector.

8. The receiver according to claim 6 wherein the means for coupling said optical detectors to said video correlator comprises a pair of video amplifiers.

9. The receiver according to claim 6 wherein said optical assembly comprises in combination:
   a first optical quarter-wave plate;
   a second optical quarter-wave plate;
   an optical beam combiner coupled to said first and second quarter-wave plates; and
   a polarization beam splitter coupled to said beam combiner.

10. The receiver according to claim 9 wherein said first optical quarter-wave plate is adapted for rotation about an axis substantially parallel to its optical axis.

* * * * *